Figure 1:
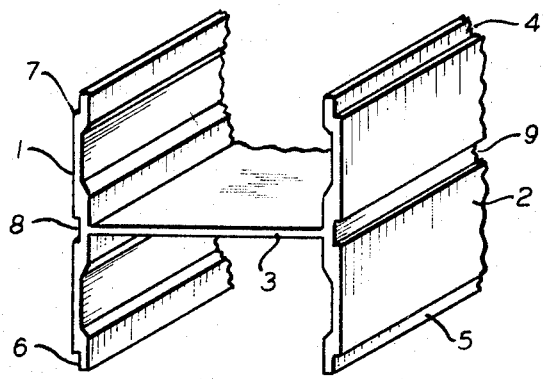

June 11, 1968     J. W. TYRER     3,387,418

MOLDING AND PARTITION ASSEMBLY SYSTEM

Filed July 15, 1964     5 Sheets-Sheet 1

INVENTOR
JAMES W. TYRER
BY James D. Heilman
ATTORNEY.

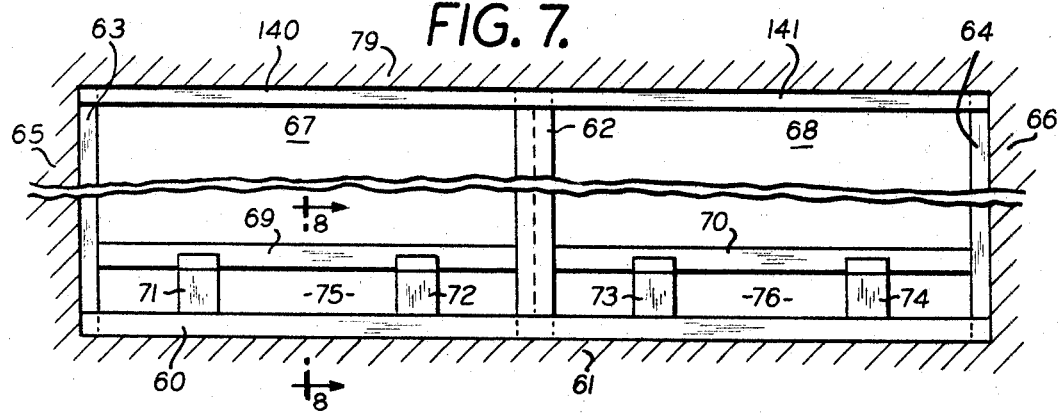
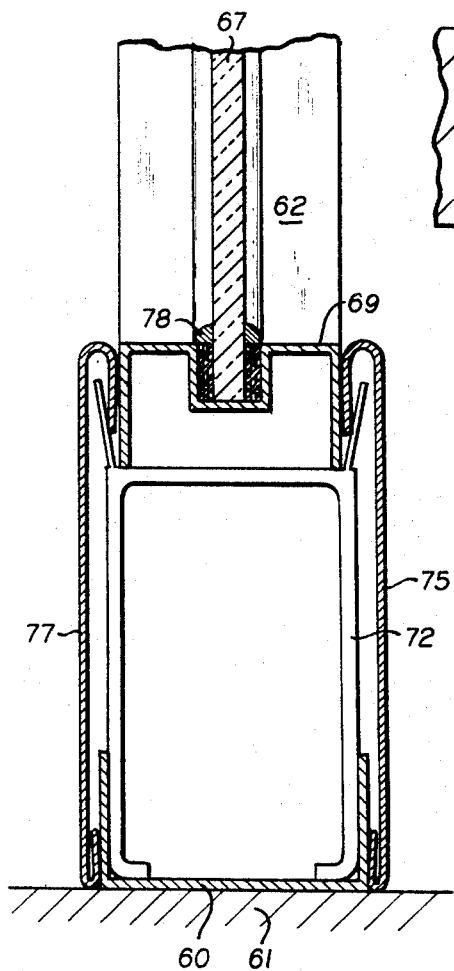
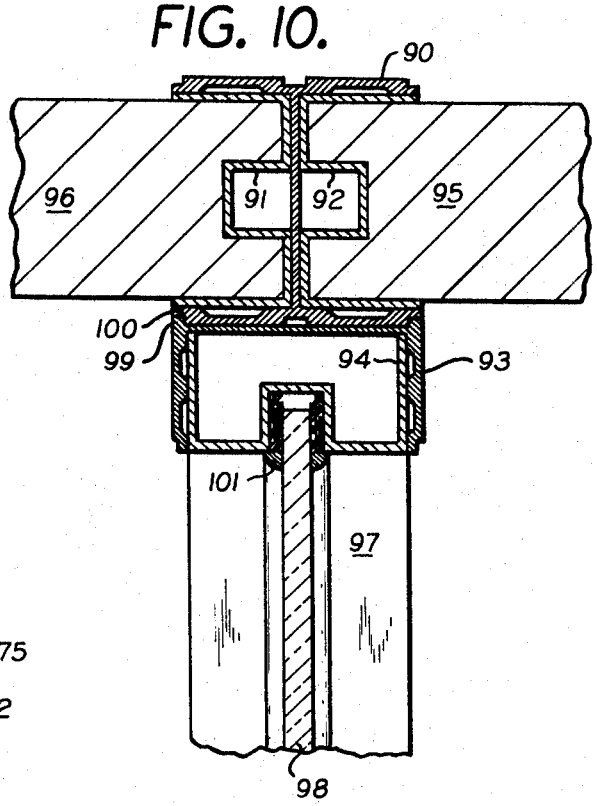

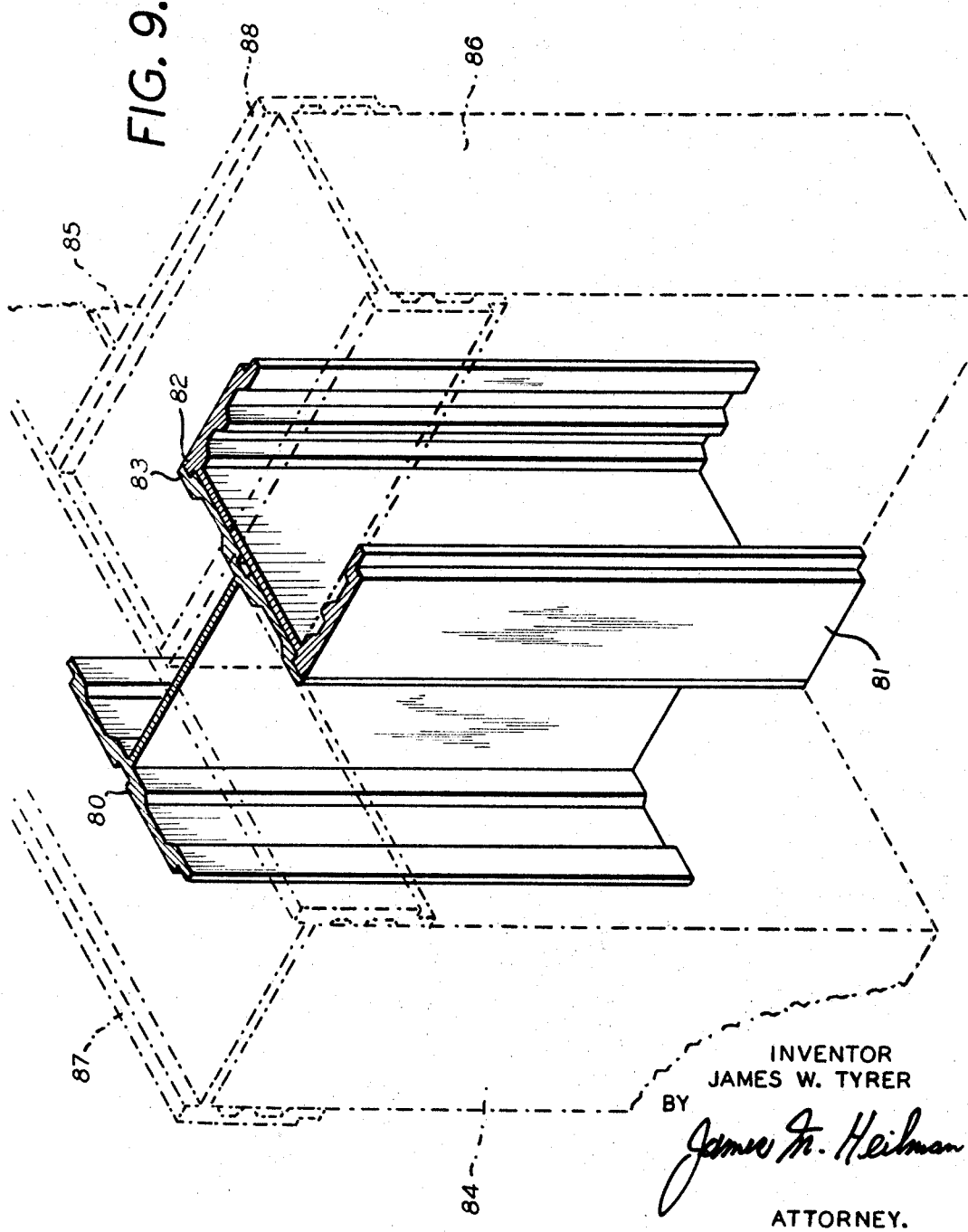

June 11, 1968  J. W. TYRER  3,387,418

MOLDING AND PARTITION ASSEMBLY SYSTEM

Filed July 15, 1964  5 Sheets-Sheet 4

INVENTOR
JAMES W. TYRER
BY

*James M. Heilman*

ATTORNEY.

June 11, 1968  J. W. TYRER  3,387,418
MOLDING AND PARTITION ASSEMBLY SYSTEM
Filed July 15, 1964  5 Sheets-Sheet 5
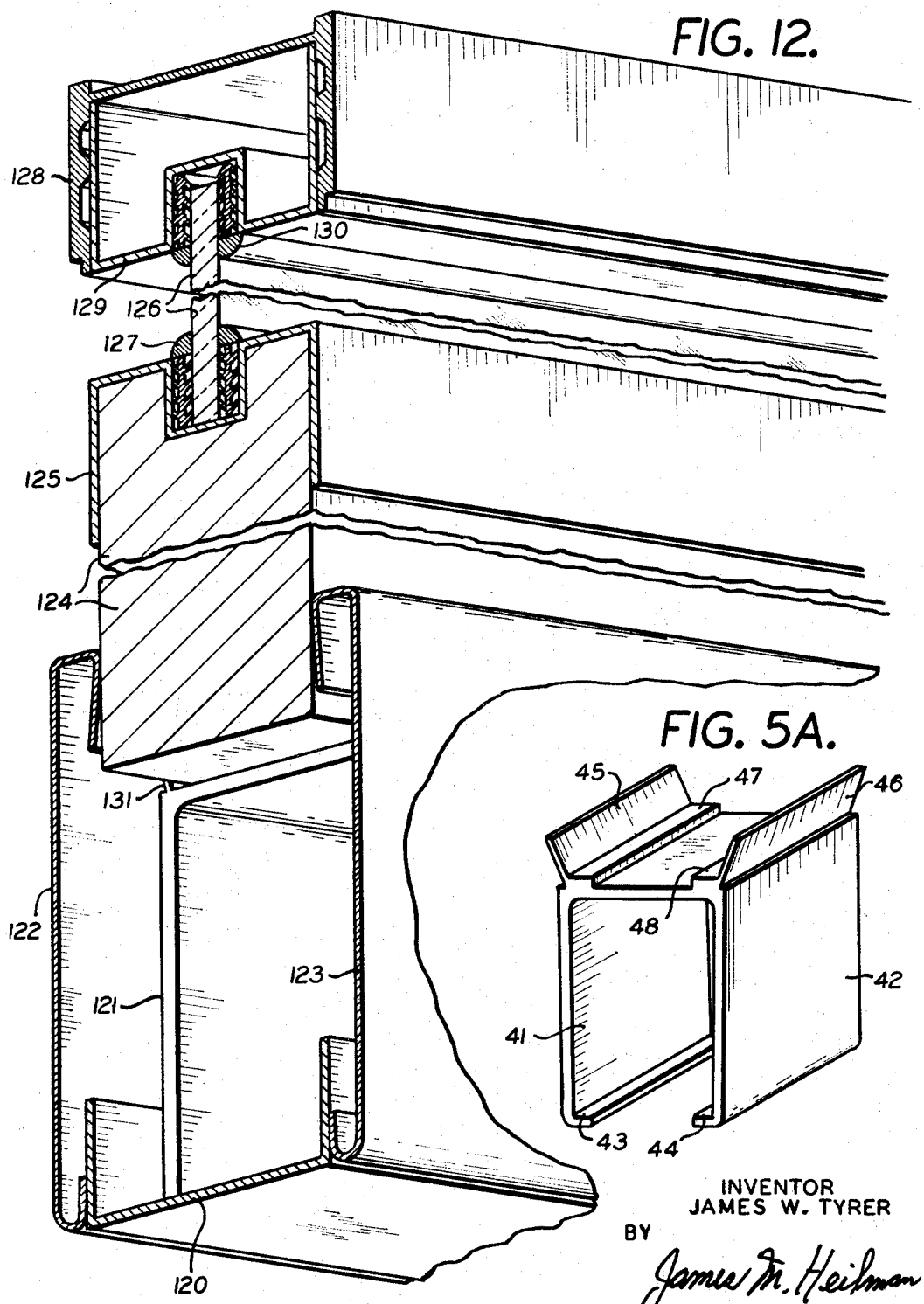
INVENTOR
JAMES W. TYRER
BY
*James M. Heilman*
ATTORNEY.

United States Patent Office 3,387,418
Patented June 11, 1968

3,387,418
MOLDING AND PARTITION ASSEMBLY SYSTEM
James W. Tyrer, 982 Top View Road,
Bloomfield Hills, Mich. 48013
Filed July 15, 1964, Ser. No. 382,835
10 Claims. (Cl. 52—242)

The present invention is generally concerned with a unique combination of elements which are adapted to be effectively utilized in the construction of movable walls, partitions and the like. The invention is more specifically concerned with a plurality of interrelated elements or structure members which may be readily adapted for use in a rapid and effective technique for partition or wall construction.

In the construction and building trade industries the use of movable walls and partitions is gaining increasingly greater usage and acceptance. In many instances it is absolutely necessary that the walls and partitions be movable, such as in office buildings, warehouses, industrial concerns and in manufacturing industries. Thus, many types of designs and structures have been suggested in the past. However, movable structures now known in the art are not entirely satisfactory for one or more reasons. In many instances the movable partition consists of too many varied and totally different structural members or elements. The part are unrelated and thus are not readily adaptable for use in different environments. In other instances the parts or elements are complicated and expensive to manufacture, thus making the cost of the set up wall prohibitively expensive and uneconomical. When the parts are complicated the labor costs of setting up the partition or wall rapidly and prohibitively increase. In other cases the design and construction is of such a nature that excessive time is required to dismantle and reconstruct the wall at a different location when this becomes desirable. Also, the wall, while movable, must present and have a look of permanency and also have a pleasing and aesthetic appearance.

The combination of interrelated structural elements with which the present invention is concerned does not have any of the objections hereinbefore mentioned. The elements are simple and interrelated. These elements are relatively inexpensive to manufacture and may be readily adapted for the economic construction of a wall or structure in any type of environment or type of building or type of room. Due to the fact that the parts are interrelated and flexible with respect to their use, labor construction costs of the set up wall are at a minimum. The wall presents a very sturdy and permanent appearance and is exceptionally pleasing to the eye.

The interrelated movable wall parts of the present invention comprise in combination a stud or H stud (stud being used to refer broadly to these molding members whether used vertically or horizontally), substantially a half stud or U member, a stud insert, a floor channel, a panel support and a base cover.

The present invention may be more readily understood by reference to the drawings illustrating embodiments of the same. FIGURES 1 to 6 inclusive show in some detail the type of construction and configuration of the respective elements. FIGURE 7 is one view of a set up wall having a plurality of panels. FIGURE 8 is a side or end view showing the interrelationship of a number of parts.

Figure 11:
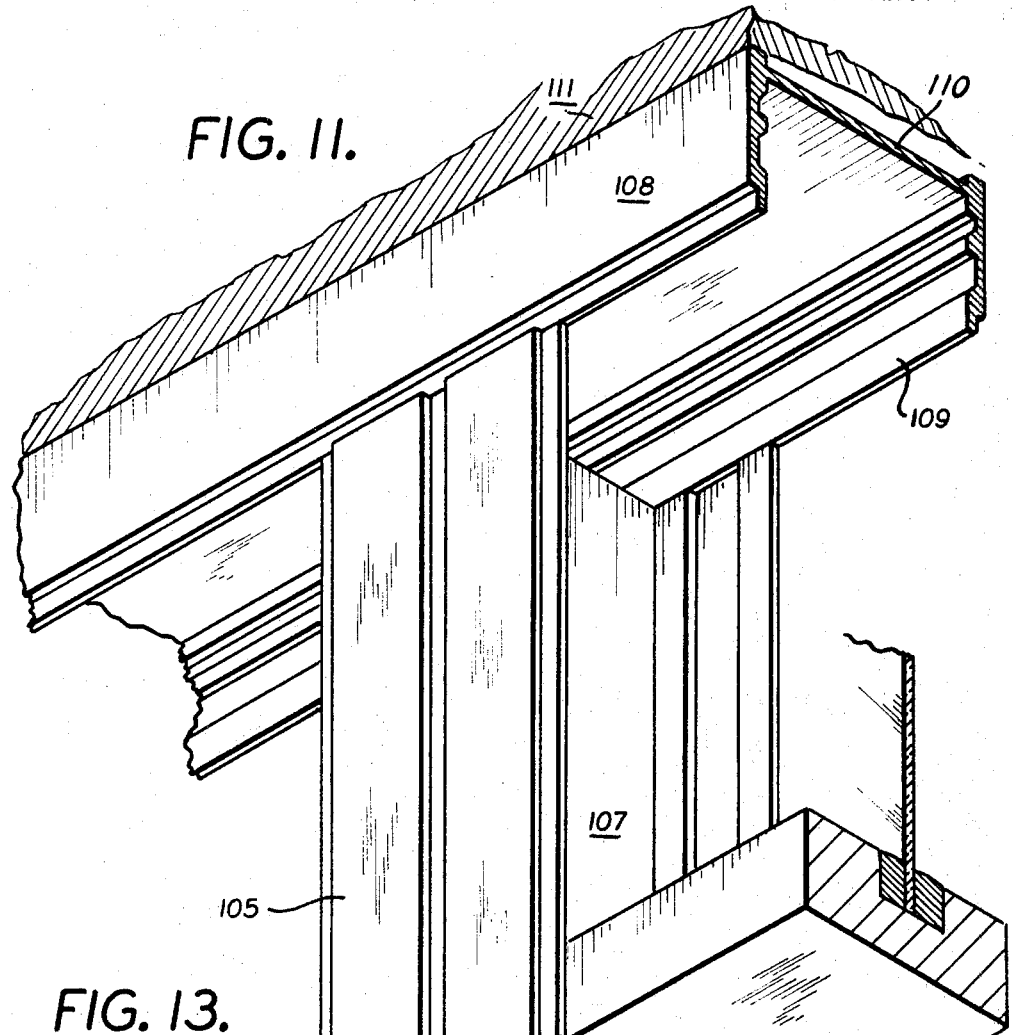

FIGURE 9 illustrates in particular one combination of the use of a full stud in conjunction with a half stud. FIGURE 10 is a top view of the use of a full stud with a half stud in conjunction with the use of inserts. FIGURE 11 illustrates the use of a full stud with a half stud which is positioned as a ceiling member. FIGURE 12 shows another combination wherein the floor channel is used with the panel supports, the base panels, and wherein the inserts are used in a different manner. The half stud is used as a ceiling member.

Referring specifically to FIGURE 1, a top view of the H-type stud or beam is illustrated. This H section stud element is designed to secure maximum rigidity with economy of section. The overall dimensions are equal in both directions so as to permit the use of the H stud or beam in a variety of conditions and constructions as will hereafter be described. This stud has legs 1 and 2 which are connected at their mid-point by means of cross-section element 3. These legs extend vertically from the plane of cross-section element 3. This stud may be of any desired length as, for example, from about 4 to 6 to 12 feet or longer. The lengths of the legs may vary as, for example, from about 1″ to 3″. However, these lengths may be smaller or longer for special purposes or special or unique construction.

It is to be noted that the ends of the respective leg elements are characterized by having off-set shoulders 4, 5, 6 and 7, formed by recesses or offsets on the outer surface of the legs at the terminal ends thereof. This permits snug and secure seating of the half stud with respect to the full stud in many types of construction some of which will be hereinafter described. The upwardly extending ears or shoulders 4, 5, 6 and 7 are on the inner sides of the legs 1 and 2. The shoulders have thicknesses of about ⅛″ to ½″ and extend upwardly about ⅛″ to ½″. It is to be noted that at the point of juncture of cross element 3 with legs 1 and 2 there are channels 8 and 9 in the respective legs.

Figure 2:
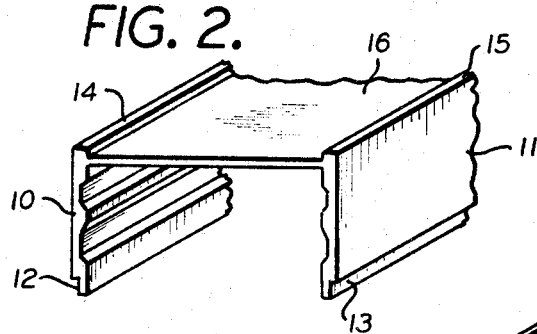

FIGURE 2 illustrates in some detail the half H stud section of the present invention. The half H stud as shown in the drawings is in the shape of a U and will be sometimes so designated. In essence, it consists of a base or cross member 16 and two legs 10 and 11 which extend vertically from the plane of base 16. Here again, the length of the half H stud may be varied, as described with respect to the full stud, depending upon its use. For example, the length may be in the range from about 1 foot to about 12 feet and higher. It is to be noted that the half stud or beam has shoulders 12 and 13 which extend beyond the ends of legs 10 and 11. Also, shoulders or heads 14 and 15 extend vertically from the plane of base 16. These shoulders 14 and 15 are adapted to seat in recesses or cut away sections 6 and 5, or 4 and 7 formed at the terminal surfaces of the legs of the full beam or H stud. Their measurements therefore complement the measurements of the shoulders of the full stud so as to secure a snug and tight nesting of the respective elements.

Figure 3:
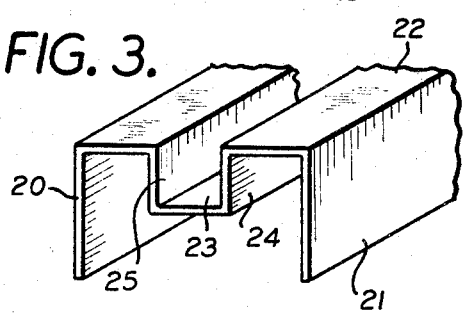

Reference is made to FIGURE 3 which illustrates the insert. This insert snugly seats within either side of the H section or within the substantially one-half H or U section. In essence, the insert comprises legs 20 and 21 which extend vertically from the plane of a base section 22. The base section 22 of the insert is characterized by having a longitudinal channel 23 extending vertically from the plane of the base section between legs 20 and 21. This channel is laterally spaced with respect to the base section 22 at its mid-point. The longitudinal axis of the channel is parallel to the planes of legs 20 and 21. The width of the legs 24 and 25 of the channel is approximately one-half the width of legs 20 and 21. This insert is roughly in the form of a W, or more specifically in the form of a square or block W.

Figure 4:
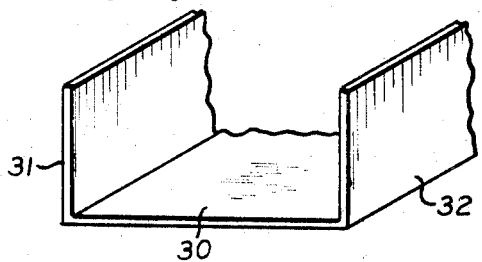

Reference is made to FIGURE 4 showing the floor channel. The floor channel comprises, in essence, a base section 30 and two leg sections 31 and 32 which extend vertically from the plane of the base section 30. This section is utilized in a manner as hereinafter described.

Figure 6:
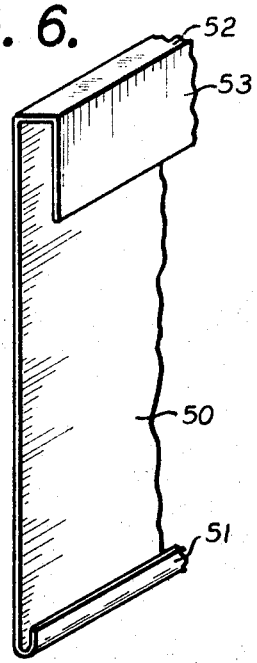
Figure 5:
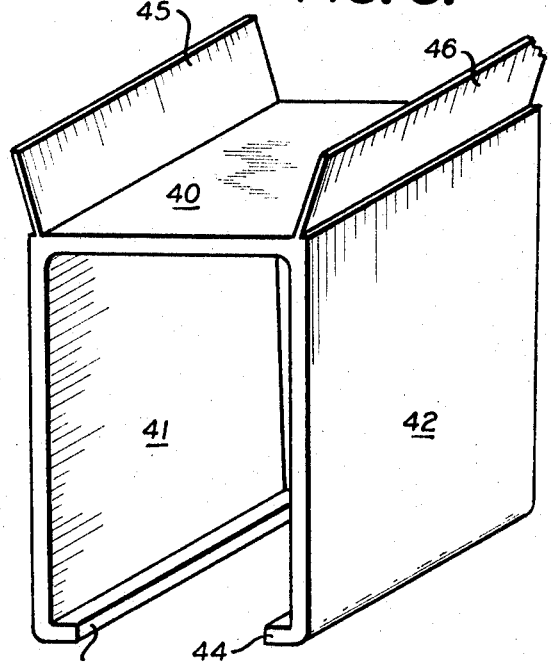

The panel support as shown in FIGURE 5 in essence comprises a base section 40 having two legs 41 and 42 which extend vertically from the plane of the base section 40. Extending inwardly in a plane parallel to the plane of base 40 are ear sections 43 and 44. Also lips, ears, or wings 45 and 46 extend or flare outwardly from the sides of the base section 40. The base cover, as shown in FIGURE 6, in essence, comprises a hook-like element having a base 50, a flared or crimped lower edge 51 and hooked upper edges 52 and 53. Edge or surface 52 is substantially perpendicular to the plane of base 50 while surface 53 is substantially parallel to surface or base plane 50.

Reference is made to FIGURE 7 which shows in some detail a front view of a partition or wall section. Floor channel 60 is positioned along floor 61 and extends from wall 65 to wall 66. The full stud or H element 62 extends vertically from floor 61 to ceiling 79. A half stud 63 is positioned vertically along wall 65 while half stud 64 runs vertically upwardly along wall 66. Half studs 140 and 141 run horizontally along ceiling 79. Panel supports 71, 72, 73 and 74 are seated in floor channel 60. These elements support horizontally positioned inserts 69 and 70. Panels 67 and 68, which may be of wood or glass and the like, are seated in the inserts and extend to the ceiling and into half channels 140 and 141. Base covers 75 and 76 are also supported by the panel supports.

FIGURE 8 is a view of the structure illustrated in FIGURE 7 through 8—8. Similar elements are similarly numbered. Floor channel 60 is positioned on floor 61. Panel support 72 is positioned in the floor channel 60 and helps support insert 69. Panel support 72 helps support base covers 75 and 77. Insert 69 supports panel 67 which seats in the channel of the insert. Backing 78 is used to seat panel 67 to insert 69 and render the same soundproof.

Reference is made to FIGURE 9 which is a top view in perspective illustrating a right angle partition structure, and is an extension of the structure shown in FIGURE 7. Full H stud 80 is shown extending from the floor to half stud 87 running along the ceiling. Stud 80 holds panels 84 and 85 in a secure position along their lateral edges, while one-half stud 87 holds panels 84 and 85 in a secure position along their top edges. Half stud 81 is also shown extending from the floor to the one-half stud 88 running along the ceiling and is holding securely panel 86 at right angles to the partition maintained by full stud 80. It is to be noted that the ears 82 of half stud 81 seat securely in the recesses 83 which extend along the edges of the full stud 80. This functions to maintain a very stable structure and to render the same more nearly soundproof.

Reference is made to FIGURE 10 which is a top view of a right angle partition and is an extension of the structure illustrated in FIGURE 9 with some variations. Full stud 90 extends from the floor to the ceiling and has within each section thereof inserts 91 and 92. Panels 95 and 96 contain longitudinal recesses in their sides permitting the channels of inserts 91 and 92 to seat in these recesses. Panels 95 and 96 are held securely on their outer surfaces by the H stud 90 and further securely held by inserts 91 and 92. The longitudinal recesses in the edges of the panels secure a very desirable and a very rigid type of construction, which at the same time may be readily constructed and dismantled as desired.

Half stud 93 seats securely along the front face of full H stud 90 by means of ears 99 and recesses 100. At the same time, insert 94 seats within the half stud 93 and permits the secure seating of panel 98 within the recess of the insert as shown. Panel 98 is supported at the lower edge thereof by a horizontal insert 97 which in turn is supported by panel supports, not shown. Further soundproofing and support is secured by utilizing a mastic 101 around the edge of the panel within the recess of insert 94.

Reference is made to FIGURE 11 showing a view in perspective of a full H stud or H beam extending from the floor to the ceiling and supporting a half stud running along the ceiling. Legs 105 and 106 of the H stud are connected rigidly by cross member 107. The stud extends from the floor to the ceiling and supports a half stud containing legs 108 and 109 connected by cross-over 110 which extends along ceiling 111. This permits a very unique type of rigid and strong structure which is adapted for the insertion of panels (not shown) which will be supported about their upper edge by seating within the half stud which is along the ceiling. These panels will be supported along the side edges by seating within legs 105 and 106 against the crossover or base 107 of the full stud. If desired, a horizontal member 112 may run horizontally along the floor and seat behind the faces or legs 105 and 106.

Reference is made to FIGURE 12 wherein another unique type of structure is shown in perspective. A floor channel 120 is positioned along the floor. Panel support 121 is shown positioned within channel 120. This panel support has outwardly extending ears 131 which support base covers 122 and 123 having either a curved upper edge (FIG. 8) or a flat upper edge (FIGS. 6 and 12). A panel which may be made of wood, such as plywood, 124 is shown supported by the panel support 121. This panel 124 probably has a longitudinal groove along its upper edge into which the channels of insert 125 seat. A partition as, for example, a glass partition 126 seats in the recess or channel of insert 125 and is securely fastened or sealed therein by a mastic or other suitable material 127. A half stud 128 is positioned along the ceiling and has seated therein insert 129. The upper edge of glass panel 126, for example, seats within the recess or channel of insert 129 and is securely sealed or seated therein by means of a mastic or plastic extension or other suitable material 130. The horizontal members are covered at their ends by means of studs which thereby conceal the joints.

Figure 13:
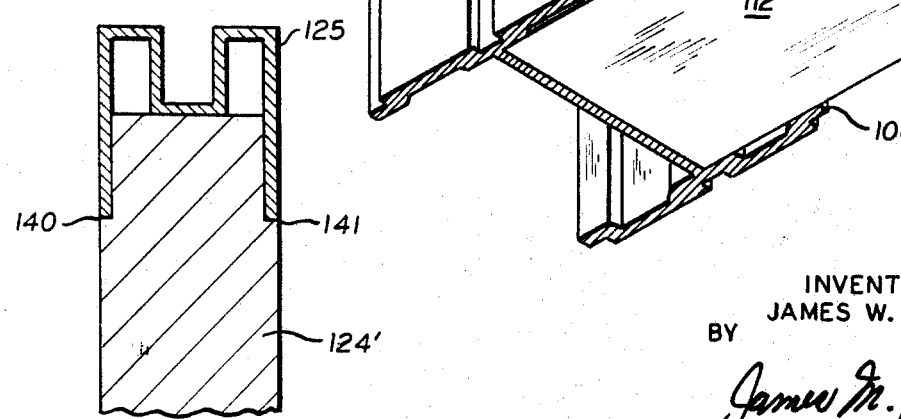

A modification of the structure shown in FIG. 12 is illustrated in FIG. 13. Instead of a longitudinal groove in panel 124 the upper sides are indented to form shoulders 140 and 141. The depth of the shoulders is of such depth to permit the channel of the insert to rest on the top edge of the panel. Thus the sides of the panel 124 are flush with the sides in the insert. All other elements may be similar to those described with respect to FIG. 12.

As pointed out heretofore, the present invention is concerned with a unique combination of structural elements which are adapted to be effectively utilized in the construction of various types of movable and even stationary partition, walls, and the like. The applicant has presented in the drawings a number of specific embodiments to illustrate the wide variety of construction to which his unique combination of only six elements can be adapted.

Also as pointed out heretofore, the stud or H beam is designed to permit maximum rigidity with economy of section. The overall dimensions are equal in both directions to permit its use in a variety of conditions, as illustrated. The stud does not generally carry the panel weight, but provides a cover or trim member for the panel edges, thus greatly simplifying panel construction, field fabrication and the various alterations which may be required at the construction site. The half stud is a channel substantially the size and shape of the stud that has two of its legs removed. This part is used as a ceiling channel or as a wall channel. The insert will match with both stud and the half stud and is dimensioned to be flush with either member and thus form a post or tube. It is effectively used for vertical and horizontal glazing and as a panel frame. The floor channels, as pointed out, are auxiliary equipment and are designed for the system to permit variations and adaptations of the same.

The H stud may be adapted for various types of structures. This element may be used as a vertical frame between two panels, such as two plywood faced partition panels, or as a vertical frame between a glass panel and a wood panel, or as a vertical frame between two glass panels. The H stud may also be adapted as a cornice member, or as a door header. The H stud may also be used horizontally for transom elevation. This H stud with the inserts may be adapted as a post element. Also, this member be used as a vertical post support for shelving and the like. The half stud may be used as a wall channel, or as a ceiling channel, or as a handrail and the like, or as a cap rail. The insert element may be used as a horizontal chair rail member between a panel and glass. This element may also be used as a vertical cap member or may be placed either in a vertical or a horizontal position. The system may also be readily adapted for the utilities such as telephone, dictaphone, electrical connections, thermostat controls and the like.

Various modifications can be made to the molding elements. For example, the short length panel support may be equipped with steps 47 and 48 on each side of head 40 as shown in FIG. 5a. This step prevents element 69 from shifting even when pressure is exerted from one side, and provides a seat or positive stop for skirts 75 and 77. Other modifications are readily apparent.

What is claimed is:

1. Movable partition jointure which comprises in combination; (1) an H stud which extends vertically from a supporting floor toward a ceiling, said H stud being characterized by two stud leg sections affixed at their midpoints by a stud cross section perpendicular to the face planes of said stud leg sections, said stud leg sections characterized by the ends thereof having protruding shoulder sections; (2) a half H stud characterized by leg sections joined by means of a cross section perpendicular to the face planes of said leg sections, one end of each leg section extending slightly beyond one face of said cross section to form shoulders, said half H stud being positioned vertical on said floor in relationship to said H stud that the shoulders of said half H stud seat on the shoulders of said H stud and the face plane of said cross section of said half H stud is parallel to the face planes of said leg sections of said H stud; and (3) three panels, the face planes of which are perpendicular to said floor, the vertical edges of said panels being seated within and supported by the leg sections of said studs.

2. Movable wall partition jointure which comprises in combination; an H stud positioned vertically on a floor, said H stud characterized by having two parallel leg sections affixed at their mid-points by means of a cross section, the ends of said leg sections having shoulders; (2) a half H stud characterized by having two leg sections connected by a cross section perpendicular to the face planes of said leg sections in a manner that one end of each leg section protrudes slightly beyond one face of said cross section to produce shoulders, said half H stud being positioned vertically on said floor in relationship to said H stud that the shoulders of said half H stud seat on the shoulders of said H stud and the face plane of the cross section of said half H stud is parallel to the face planes of the parallel legs of said H stud; and (3) two inserts entirely positioned within the legs of said H stud, said inserts characterized by having a base section, two leg sections extending perpendicular from one face of said base section and a channel section extending perpendicular from the same one face of said base section midway between said leg sections, said two inserts being positioned within the legs of said H stud in a manner that the other faces of said inserts rest along the respective faces of the cross section of said H stud, whereby said channel sections extend outwardly from said cross section and; (4) a third insert identical with said two inserts positioned entirely within said half H stud, said third insert being positioned in a manner that the channel section of said third insert extends from the base section of said insert toward the cross section of said H stud; and (5) two panels positioned in a manner that the planes of their faces are perpendicular with respect to said floor, the vertical edges of said panels being grooved in a manner to seat the channels of said inserts, whereby a rigid structure is secured; and (6) a third panel positioned so that the planes of its faces are perpendicular to said floor, the vertical edge of said third panel being seated with the channel of said third insert.

3. Movable room partition which comprises in combination, an H stud extending vertically from a supporting floor to a ceiling, a floor channel extending horizontally along a floor, said floor channel characterized by having a channel base section and two channel side sections which are perpendicular to the plane of said channel base section; a half H stud extending vertically along a side wall, panel supports seated within said floor channel, said panel supports characterized by having a panel base section and two panel leg sections which extend downwardly perpendicular to the plane of said panel base section; a panel, the faces of which are perpendicular to said floor, said panel supported by said panel base section along its lower side and supported by said studs along its vertical sides, said H stud characterized by two parallel leg sections affixed at their mid-points by means of a cross section which is perpendicular to the face planes of said leg sections, said leg sections having shoulders at the ends thereof; a second, half H stud, characterized by having two leg sections connected by a cross section perpendicular to the face planes of said leg sections in a manner that one end of each leg section protrudes slightly beyond one face of said cross section to produce shoulders, said second, half H stud being positioned vertically on said floor in relationship to said H stud that the shoulders of said half H stud seat on the shoulders of the legs of said H stud and the face plane of the cross section of said half H stud is parallel to the face planes of the leg sections of said H stud, and a second panel positioned in a manner that its face planes are vertical with respect to said floor, the vertical edge of said second panel being seated within the legs of said second, half H stud.

4. A combination of interrelated structural elements for the construction of a movable partition which comprises an H stud vertically positioned on a supporting floor, said H stud characterized by two leg elements secured at their mid-points by a cross member, said leg elements extending substantially at right angles to the plane of said cross member, a half stud horizontally positioned along a ceiling, said half stud characterized by two leg elements secured substantially at their ends by a cross member so as to provide a head for each leg, said first mentioned leg elements engaged solely by said latter two leg elements to position said H stud without additional fastening means, said latter two leg elements extending at right angles to the plane of said latter cross member whereby panels may be positioned to form a partition and securely held in position by the panel edges seating between at least two of said leg elements.

5. A combination of structural elements as defined by claim 4 wherein an insert is positioned within said legs of said half stud, said insert characterized by two insert legs extending from the plane of a cross connecting insert base member, said insert further characterized by an insert channel extending at right angles to the plane of said insert base, and the longitudinal axis of said channel being at the mid-point between said insert legs.

6. Structural elements as defined by claim 4 wherein the terminal ends of said legs of said H stud are recessed, and wherein the ends of the legs of a second half stud extend just beyond and adjacent the cross member of said second half stud to form a head and to nest said ends of said extending legs into said recesses so that the plane of said cross member is parallel to the plane of the legs of said H stud.

7. A partition molding system comprising three molding elements in combination, a full H stud, a half stud interconnected with said full H stud along their respective lateral edges, an insert formed with an open box-like side to receive a thick panel, said insert also formed with a groove-like strip in the opposite side thereof, said insert positioned in said half stud and adapted to be positioned with either side facing in an outwardly direction so as to receive either a thick or a thin panel and form a partition wall therewith.

8. A partition system for positioning partitions consisting of panels and a series of interfitting and interchangeable moldings having an intermediate area relatively wide to receive and hold a thick opaque panel, and certain of said interfitting and interchangeable moldings having an intermediate area to receive and hold a thin panel, and certain of said elements designed to receive, alternatively, either a wide panel, a thin panel or an intermediate positioning member, and an H-shaped member formed by a cross piece connecting two legs of varying thickness among this latter group of elements designed to receive either a wide panel, a narrow panel, or an intermediate positioning member, said H member so constructed and arranged to receive certain of these panels direct, while other panels are received indirectly by means of said intermediate positioning member, each leg of the H member is provided with a recess at its end for interconnecting additional positioning elements in said system, and a decorative groove located near the mid-point on each leg of the said H member, a substantially U-shaped member having heads on each leg of said U near the cross member, said heads being secured in the recesses in the legs of said H member whereby to provide a sturdy construction.

9. A partitioning system as set forth in claim 8, having one or more substantially W-shaped elements fitted within the legs of said H and said U elements, and a relatively thin transparent panel positioned within the central portion of the W element.

10. A partitioning system for a room with ceiling and a floor consisting of panels and an H stud member having legs positioned vertically between a ceiling and a floor, said panel positioned between the legs of said H member, one or more U-shaped half stud members interconnected vertically along the side of the legs of said H member, and a second U-shaped half stud member positioned horizontally along the ceiling to form a ceiling molding and to secure both said H member and said first U member to said second U member, a base channel molding supported on the floor, a support within said channel molding to receive the panel, lips on said support, and skirts depending from said lips for decoration and to hide said base channel moldings and said support, a substantially block W-shaped element, said W-shaped element positioned intermediate said support and said panel, and contacting said panel throughout its length while being supported by said support for limited areas at spaced points, said lips on said support flaring outwardly, and said depending skirts having downturned upper edges loosely placed on said lips, and stops adjacent said lips to position and tightly secure said W element and said panel, and to provide a positive stop for said downturned upper edges of said skirts.

References Cited
UNITED STATES PATENTS

| | | | |
|---|---|---|---|
| 2,878,904 | 3/1959 | Fanner | 52—579 X |
| 3,072,226 | 1/1963 | Harwood | 52—495 X |
| 3,078,968 | 2/1963 | Frick | 52—241 |
| 3,125,193 | 3/1964 | Brown et al. | 52—242 |
| 3,180,457 | 4/1965 | Bohnsack | 52—220 |
| 3,209,869 | 10/1965 | Hammitt | 52—729 X |
| 3,217,452 | 11/1965 | Steele | 52—242 |

FRANK L. ABBOTT, *Primary Examiner.*

A. C. PERHAM, *Assistant Examiner.*